(12) United States Patent
Panindre et al.

(10) Patent No.: US 10,684,418 B2
(45) Date of Patent: Jun. 16, 2020

(54) CLOSED LOOP MICRORESONATORS HAVING LINEAR PORTIONS AND FILLETED CORNERS, SYSTEMS INCLUDING SUCH MICRORESONATORS, AND METHODS OF FABRICATING SUCH MICRORESONATORS

(71) Applicant: New York University, New York, NY (US)

(72) Inventors: Prabodh Panindre, Brooklyn, NY (US); Sunil Kumar, Abu Dhabi (AE)

(73) Assignees: New York University, New York, NY (US); New York Univeristy in Abu Dhabi Corporation, Abu Dhabi (AE)

( * ) Notice: Subject to any disclaimer, the term of this patent is extended or adjusted under 35 U.S.C. 154(b) by 73 days.

(21) Appl. No.: 15/778,617

(22) PCT Filed: Nov. 24, 2016

(86) PCT No.: PCT/US2016/063726
§ 371 (c)(1),
(2) Date: May 23, 2018

(87) PCT Pub. No.: WO2017/091795
PCT Pub. Date: Jun. 1, 2017

(65) Prior Publication Data
US 2019/0339455 A1     Nov. 7, 2019

Related U.S. Application Data

(60) Provisional application No. 62/260,018, filed on Nov. 25, 2015.

(51) Int. Cl.
G02B 6/293     (2006.01)
G02B 6/12     (2006.01)
(Continued)

(52) U.S. Cl.
CPC ..... *G02B 6/29338* (2013.01); *G02B 6/12007* (2013.01); *G02B 6/1223* (2013.01); *G02B 6/136* (2013.01)

(58) Field of Classification Search
CPC ............ G02B 6/29338; G02B 6/12007; G02B 6/1223; G02B 6/136
(Continued)

(56) References Cited

U.S. PATENT DOCUMENTS

| 6,218,915 B1 * | 4/2001 | Schallner | ............... H01P 7/082 333/204 |
| 6,763,052 B2 | 7/2004 | Huang | |

(Continued)

OTHER PUBLICATIONS

International Search Report ("ISR") dated Mar. 16, 2017 (2 pgs.) and Written Opinion of the International Searching Authority (3 pgs.), from corresponding International Application No. PCT/US2016/063726.

(Continued)

*Primary Examiner* — Jerry M Blevins
(74) *Attorney, Agent, or Firm* — John C. Pokotylo; Polotylo Patent Services

(57) ABSTRACT

The use of microresonators with sharp corners (rectangular and square-shaped) can be limited by severe energy loss at the corners. The effect of incorporating fillet design at sharp corners (rounding of corners) of such single mode optical microresonators is described. The effect on quality factor, free spectral range ("FSR"), and energy loss for varying values of fillet radii are quantified and compared with standard circular microring resonator. It is shown that the selection of optimum fillet radius for sharp-cornered microresonators provide higher quality factor than that of the conventional circular resonators.

16 Claims, 15 Drawing Sheets

(51) Int. Cl.
*G02B 6/122* (2006.01)
*G02B 6/136* (2006.01)

(58) Field of Classification Search
USPC .............................................. 385/2
See application file for complete search history.

(56) References Cited

U.S. PATENT DOCUMENTS

| | | |
|---|---|---|
| 6,885,794 B2 | 4/2005 | Scheuer et al. |
| 7,539,375 B2 | 5/2009 | Popovic |
| 7,929,589 B1 | 4/2011 | Ilchenko et al. |
| 7,965,914 B2 | 6/2011 | Xu et al. |
| 9,188,798 B2 | 11/2015 | Taylor |
| 2009/0310140 A1* | 12/2009 | Smith ................ G01N 21/7746 356/480 |

OTHER PUBLICATIONS

S. Arnold, et al, "Shift of whispering-gallery modes in microspheres by protein adsorption," *Optics Letters*, vol. 28, No. 4, pp. 272-274 (Feb. 15, 2003, Optical Society of America).

* cited by examiner

200

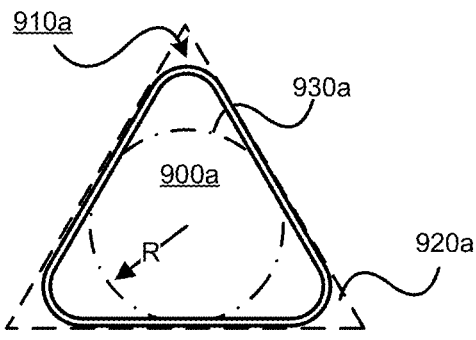
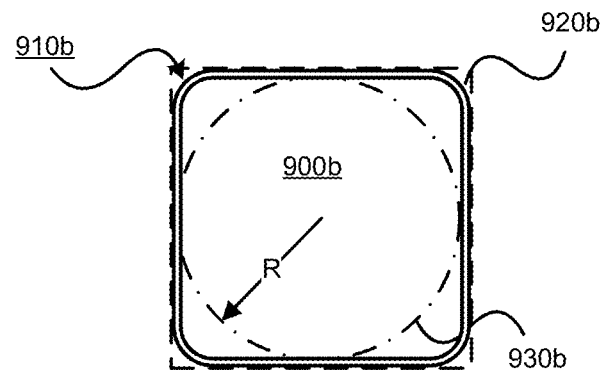
FIGURE 9A
FIGURE 9B
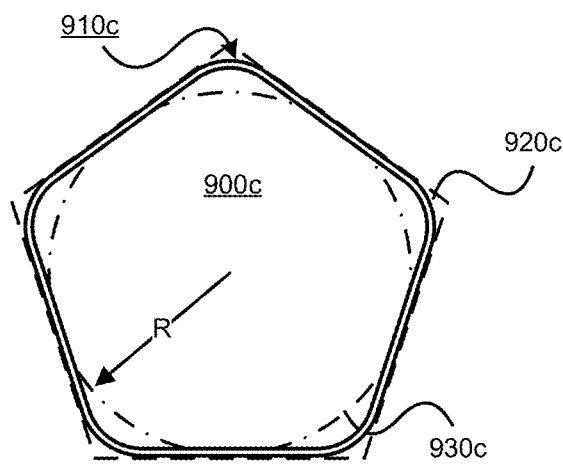
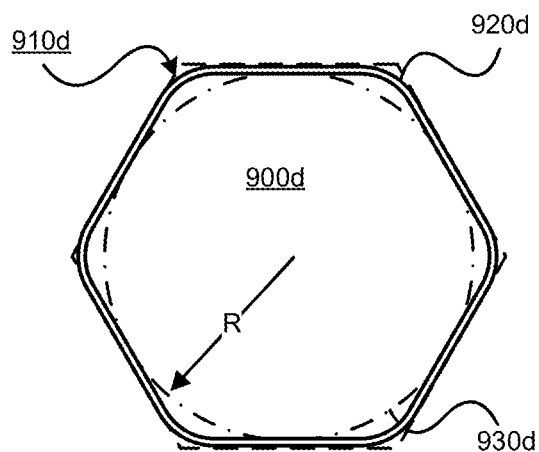
FIGURE 9C
FIGURE 9D
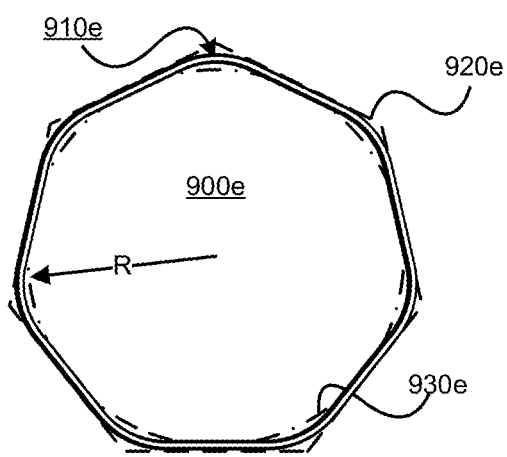
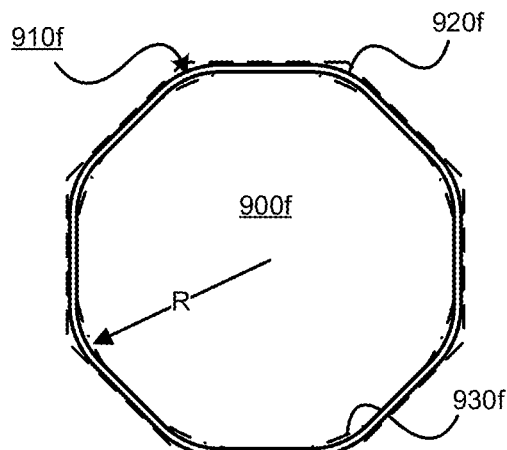
FIGURE 9E
FIGURE 9F

CLOSED LOOP MICRORESONATORS HAVING LINEAR PORTIONS AND FILLETED CORNERS, SYSTEMS INCLUDING SUCH MICRORESONATORS, AND METHODS OF FABRICATING SUCH MICRORESONATORS

§ 0. RELATED APPLICATIONS

This application claims benefit to U.S. Provisional Application Ser. No. 62/260,018 (referred to as "the '018 provisional" and incorporated herein by reference), titled "CLOSED LOOP MICRORESONATORS HAVING LINEAR PORTIONS AND FILLETED CORNERS, SYSTEMS INCLUDING SUCH MICRORESONATORS, AND METHODS OF FABRICATING SUCH MICRORESONATORS," filed on Nov. 25, 2015 and listing Prabodh PANINDRE and Sunil KUMAR as the inventors. The scope of the present invention is not limited to any requirements of the specific embodiments described in '018 provisional.

§ 1. BACKGROUND INFORMATION

An optical resonance occurs when light waves confined by total internal reflection in a closed loop dielectric microstructure are reflected back on the same optical path where they build up in intensity over multiple round-trips due to constructive interference. For materials with a constant refractive index, in order for light to interfere constructively inside the resonator, the optical path length must be an integer multiple of the wavelength of the light and therefore the resonant conditions can occur only at certain wavelengths. (See, e.g.: Bahaa Saleh, Malvin Teich, "*Fundamentals of Photonics*," (New York: Wiley, 1991) (incorporated herein by reference); John Jackson, "*Classical Electrodynamics*," (New York etc.: Wiley, 1962) (incorporated herein by reference); Andrey B. Matsko, and Vladimir S. Ilchenko, "Optical Resonators with Whispering—Gallery Modes—Part I: Basics," *IEEE Journal Selected Topics in Quantum Electronics*, 12(1) 3-14, (2006) (incorporated herein by reference); and David K. Cheng, "*Field and Wave Electromagnetics*," (New York: Addison-Wesley, 1989) (incorporated herein by reference).) A shift in optical resonance frequency due to change in surrounding conditions has been used for different types of measurements and detections. (See, e.g.: Vladimir S. Ilchenko, and Andrey B. Matsko, "Optical Resonators with Whispering-Gallery Modes—Part II: Applications," *IEEE Journal of Selected Topics in Quantum Electronics*, 12(1), pp. 15-32, (2006) (incorporated herein by reference); F. Vollmer, et al., "Protein Detection by Optical Shift of a Resonant Microcavity," Applied Physics Letters 80.21 (2002): 4057-4059 (incorporated herein by reference); and Anisur Rahman, and Sunil Kumar, "Optical Resonance in Dielectric Micro-sphere for Temperature Measurement." *ASME/JSME* 2007 *Thermal Engineering Heat Transfer Summer Conference collocated with the ASME* 2007 *InterPACK Conference*, American Society of Mechanical Engineers, 2007 (incorporated herein by reference).) Microstructures that generate optical resonances and exploit their properties for various applications have primarily been confined to the geometric shapes of sphere, cylinder, disk, or circular rings.

In the last decade, circular microring, solid sphere, and solid disk optical dielectric microresonators have been studied intensively due to potential applications, primarily in optical communications, biomedical sensing, spectroscopy, micro or nano-level measurements and detection, quantum mechanics, etc. The solid sphere and disk microresonators are multimode since more than one resonant mode is present. (See, e.g.: Vollmer, F., et al. "Protein Detection by Optical Shift of a Resonant Microcavity," *Applied Physics Letters*, 80.21 (2002): 4057-4059 (incorporated herein by reference); Rahman, Anisur, and Sunil Kumar, "Optical Resonance in Dielectric Micro-Sphere for Temperature Measurement." *ASME/JSME* 2007 *Thermal Engineering Heat Transfer Summer Conference collocated with the ASME* 2007 *InterPACK Conference*, American Society of Mechanical Engineers, 2007 (incorporated herein by reference); A. Rahman, R. Eze, and S. Kumar, "Novel Optical Sensor Based on Morphology-Dependent Resonances for Measuring Thermal Deformation in Microelectromechanical Systems Devices," *Journal of Micro/Nanolithography, MEMS, and MOEMS* 8.3 (2009): 033071-033071 (incorporated herein by reference); Keng, Ta Kang David, Whispering Gallery Mode Bioparticle Sensing and Transport, Doctoral Dissertation, Polytechnic Institute of New York University, 2009 (incorporated herein by reference); Kerry Vahala, "Optical Microcavities", *Nature*, 424(6950), pp. 839-846, 2003 (incorporated herein by reference); Wladyslaw Zakowicz, "Whispering-Gallery-Mode Resonances: A New Way to Accelerate Charged Particles", *Physical Review Letters*, 95, pp. 114801-1-114801-4, 2005 (incorporated herein by reference).) Challenges for evanescent coupling of circular, ring, disk, cylindrical, and spherical microresonators are due to the short interaction length and a tight submicrometer gap required between the curved resonator sidewall of the microresonator and the straight waveguide(s) coupling light from a source to the microresonator, and from the microresonator to a detector (See, e.g.: Guo, Z., Quan, H., & Pau, S, "Gap effects on whispering-gallery mode microresonances," *Optics East*, International Society for Optics and Photonics, (2005): 600204-600204 (incorporated herein by reference); Bogaerts, W., De Heyn, P., Van Vaerenbergh, T., De Vos, K., Kumar Selvaraja, S., et al., "Silicon microring resonators," *Laser & Photonics Reviews*, 6.1, (2012): 47-73 (incorporated herein by reference); and Yan, S., Li, M., Luo, L., Ma, K., Xue, C., and Zhang, W, "Optimisation Design of Coupling Region Based on SOI Micro-Ring Resonator," *Micromachines*, 6.1, (2014): 151-159 (incorporated herein by reference).)

Recently, solid dielectric multimode square-shaped microresonators have attracted interest as they offer (1) longer evanescent coupling lengths, and (2) a relatively simple geometry for fabrication. (See, e.g.: Poon, A. W., F. Courvoisier, and R. K. Chang, "Multimode Resonances in Square-Shaped Optical Microcavities," *Optics Letters*, 26.9 (2001): 632-634 (incorporated herein by reference); Boriskina, Svetlana V., et al. "Optical Modes in 2-D Imperfect Square and Triangular Microcavities," *Quantum Electronics, IEEE Journal of,* 41.6 (2005): 857-862 (incorporated herein by reference); Guo, Wei-Hua, et al. "Modes in Square Resonators," *Quantum Electronics, IEEE Journal of,* 39.12 (2003): 1563-1566 (incorporated herein by reference); Guo, Wei-Hua, et al. "Whispering-Gallery-Like Modes in Square Resonators," *Quantum Electronics, IEEE Journal of,* 39.9 (2003): 1106-1110 (incorporated herein by reference); Moon, Hee-Jong, et al. "Whispering Gallery Mode Lasing in a Gain-Coated Square Microcavity with Round Corners," *Japanese Journal of Applied Physics* 42.6B (2003): L652 (incorporated herein by reference); Fong, Chung Yan, and Andrew Poon. "Mode Field Patterns and Preferential Mode Coupling in Planar Waveguide-Coupled Square Microcavities," Optics Express 11.22 (2003): 2897-2904 (incorporated herein by reference); and Abdul Latiff, Anas, et al., "Design High-Q Square Resonator Add-Drop Filter for CWDM Application," *Australian Journal of Basic and Applied Sciences* 7.10 (2013): 364-367 (incorporated herein by reference).) Unfortunately, however, the quality factor ("Q-factor"), which is an indicator of energy loss (high Q-factor implies low energy loss), of such solid square resonators is very small and can be negatively impacted due to optical losses at sharp-corners of such microresonators. Furthermore, multimode resonators typically do not provide the desired accuracy for nano-scale or micro-scale detection, in which resonance shifts on the order of a picometer may need to be detected. Additionally, optical resonances in square structures are not prominent and not distinguished by the sharp peaks that typically characterize high quality resonances. (See, e.g., Li, Chao, and Andrew W. Poon, "Experimental Demonstration of Waveguide-Coupled Round-Cornered Octagonal Microresonators in Silicon Nitride," *Optics Letters* 30.5 (2005): 546-548 (incorporated herein by reference).)

Therefore, it would be useful to simultaneously solve the problems of difficult fabrication and evanescent coupling found in circular microresonators, and low Q-factor found in square or other sharp-cornered microresonators.

§ 2. SUMMARY OF THE INVENTION

Example embodiments consistent with the present invention include: (a) a feed optical waveguide coupled with a light source; (b) a pickup optical waveguide coupled with a detector; and (c) a microresonator evanescently coupled with both the feed optical waveguide and the pickup optical waveguide, wherein the microresonator includes an optical path defined by a polygon provided with filleted corners and a central void, thereby defining a closed loop optical channel.

In some example embodiments consistent with the present invention, the microresonator is a square with a central void and filleted corners (also referred to as a "squircular" microresonator). In some such example embodiments, the sides of the square microresonator are on the order of 100 μm and each of the filleted corners has a radius of curvature of between 5 and 15 μm (e.g., about 10 μm).

In some example embodiments consistent with the present invention, a geometry of the microresonator, a size of the microresonator, and a radius of curvature of each of the filleted corners of the microresonator are selected such that the quality factor of the microresonator is at least twice that of a circular microresonator having a size bound by the size of the microresonator.

In some example embodiments consistent with the present invention, the feed optical waveguide and/or the pickup optical waveguide are evanescently coupled with the microresonator at straight segments of the microresonator.

In some example embodiments consistent with the present invention, the feed optical waveguide and/or the pickup optical waveguide are evanescently coupled with the microresonator at a curved segment at a filleted corner of the microresonator. In some such embodiments, the feed optical waveguide is evanescently coupled with the microresonator at a curved segment at a first filleted corner of the microresonator and the pickup optical waveguide is waveguide is evanescently coupled with the microresonator at a curved segment at a second filleted corner of the microresonator.

Some example embodiments consistent with the present invention include a microresonator, as described above, with only a feed optical waveguide.

Some example embodiments consistent with the present invention include a microresonator, as described above, without feed or pickup optical waveguides.

§ 3. BRIEF DESCRIPTION OF THE DRAWINGS

FIGS. 9A-9F illustrate various example microresonators, consistent with the present invention, to be evanescently coupled with both a feed optical waveguide and a pickup optical waveguide.

Figure 13:
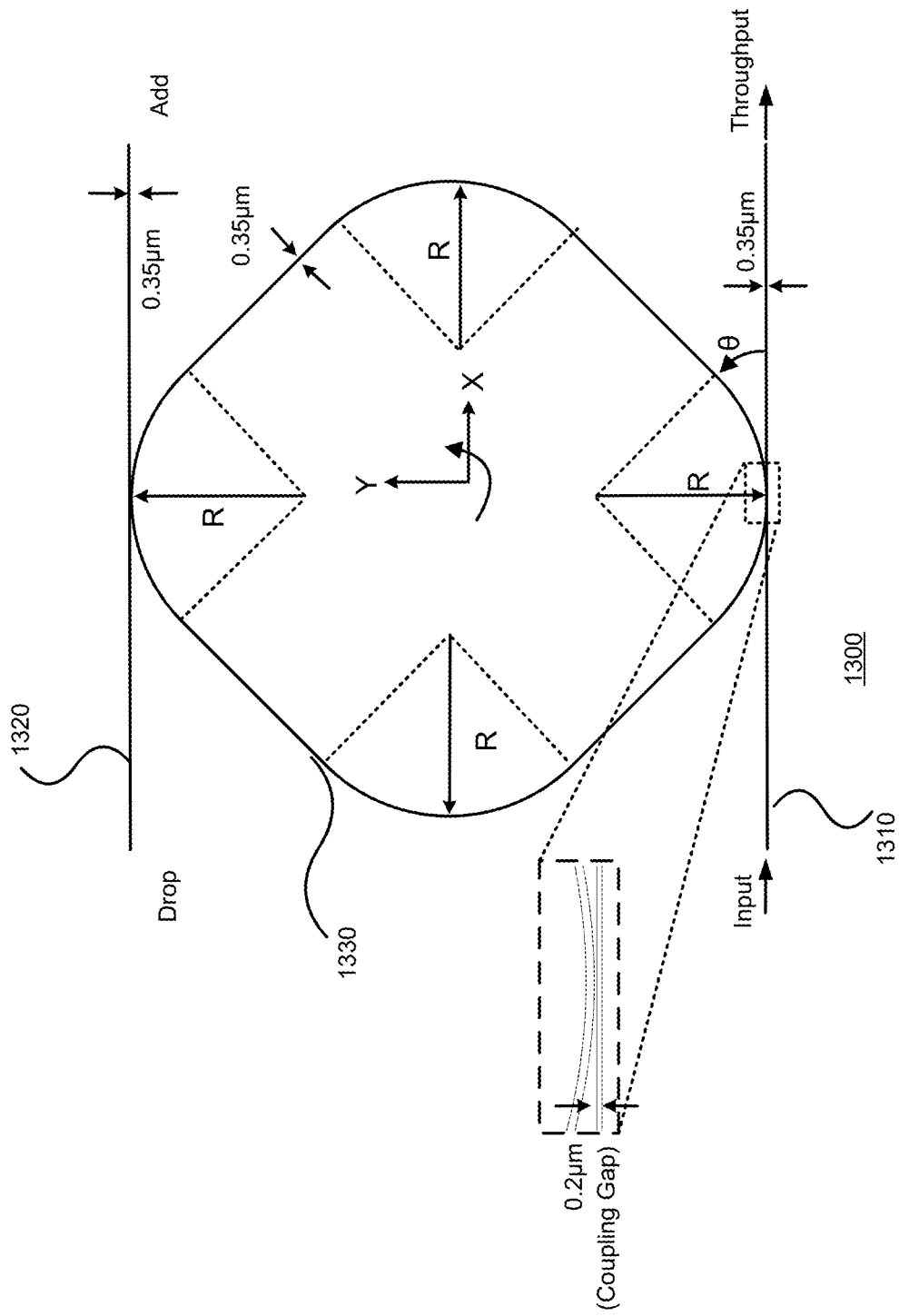
FIG. 13 is a schematic diagram of a planar waveguide-coupled filleted and hollowed square single-mode microchannel microresonator rotated through 45 degrees in counter clockwise direction with respect to feed waveguide (fillet radius R=40 μm; θ=45°, total optical path length=400 μm).
Figure 15:
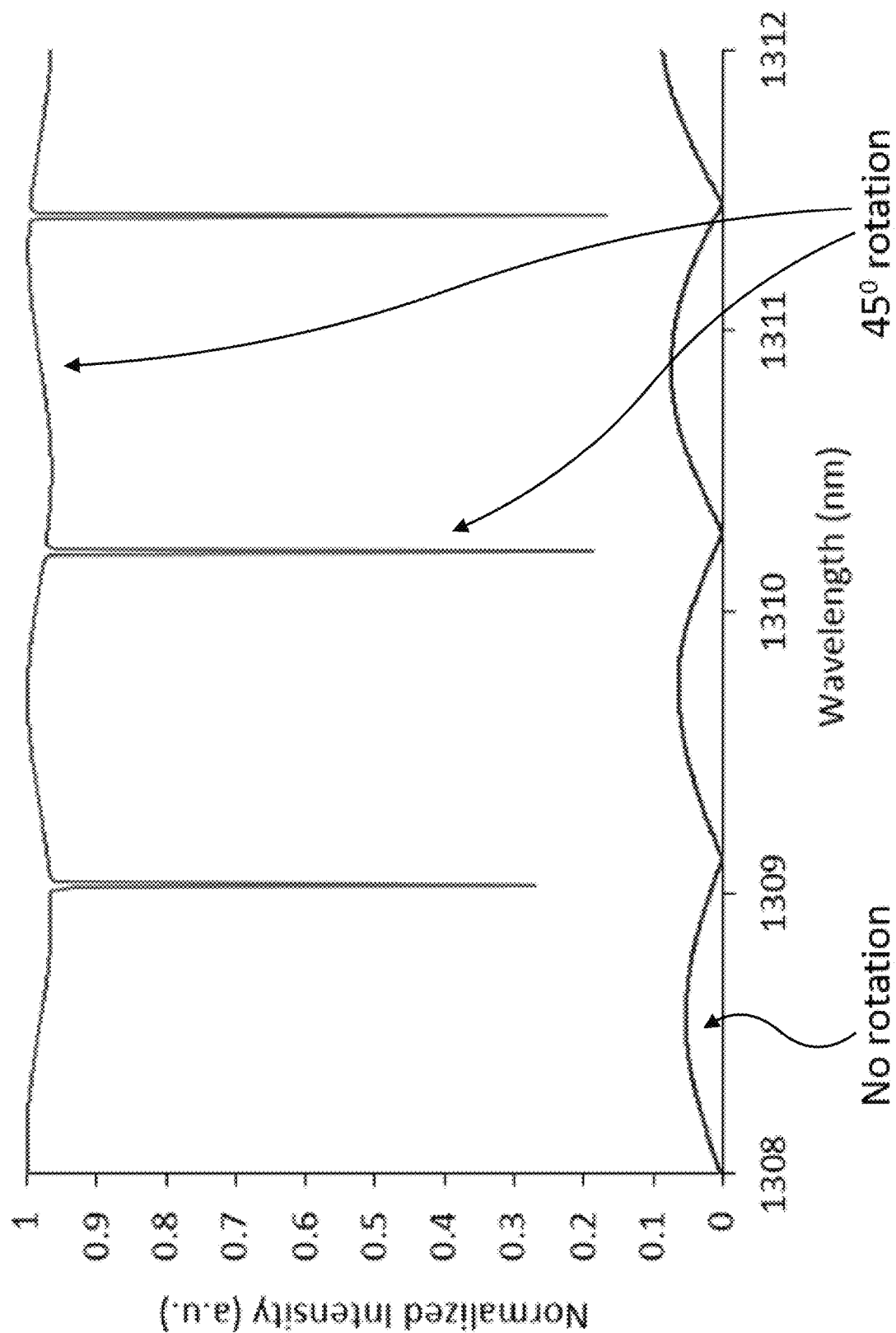

FIG. 15 includes plots comparing resonance conditions of 45 degrees rotated microresonator depicted in FIG. 13 with resonance obtained using same resonator whose coupling side is parallel to feed waveguide (TE Mode, wavelength resolution step size=0.001 nm near resonance and 0.01 nm elsewhere).

§ 4. DETAILED DESCRIPTION

§ 4.1 Example Embodiments

FIGS. 9A-9F illustrate various example microresonators 900a-900f, consistent with the present invention, to be evanescently coupled with both a feed optical waveguide and a pickup optical waveguide. (As used in this application, a "microresonator" is a resonator with dimensions in a range from 1-999 µm.) In each case, the example microresonator 900*a*-900*f* is formed as a polygon (such as a regular polygon, for example) provided with filleted (i.e., rounded) corners 910*a*-910*f*. A geometry of the microresonator, a size of the microresonator, and a radius of curvature of each of the filleted corners of the microresonator are selected such that a quality factor of the microresonator is at least twice that of a circular microresonator having a size bound by the size of the microresonator, as depicted by the dot-dashed circles 930*a*-930*f*. In each case, the microresonator can be thought of as a polygon with an empty center (referred to as a "central void"), thereby defining a microcavity or channel or waveguide in the shape of polygon with rounded corners. Thus, in each case, the microcavity or microchannel or waveguide in the shape of a polygon with rounded corners has defined inner and outer boundaries, and typically supports a single mode. Unless expressly stated to the contrary, any polygonal microresonator consistent with the present invention will have a central void, and will typically support a single mode.

More specifically, FIG. 9A illustrates an equilateral triangle microresonator channel 900*a* having a central void and filleted corners 910*a*. The outline of a corresponding triangle with sharp corners is depicted by 920*a*, and a bounded circle is depicted by dot-dashed line 930*a*. It 900*a* may be evanescently coupled with both a light source via a feed optical waveguide (neither shown) and a detector via a pickup optical waveguide (neither shown). FIG. 9B illustrates a square microresonator channel 900*b* having a central void and filleted corners 910*b*. The outline of a corresponding square with sharp corners is depicted by 920*b*, and a bounded circle is depicted by dot-dashed line 930*b*. It 900*b* may be evanescently coupled with both a light source via a feed optical waveguide (neither shown) and a detector via a pickup optical waveguide (neither shown). FIG. 9C illustrates a regular pentagon microresonator channel 900*c* having a central void and filleted corners 910*c*. The outline of a corresponding regular pentagon with sharp corners is depicted by 920*c*, and a bounded circle is depicted by dot-dashed line 930*c*. It 900*c* may be evanescently coupled with both a light source via a feed optical waveguide (neither shown) and a detector via a pickup optical waveguide (neither shown). FIG. 9D illustrates a regular hexagon microresonator channel 900*d* having a central void and filleted corners 910*d*. The outline of a corresponding regular hexagon with sharp corners is depicted by 920*d*, and a bounded circle is depicted by dot-dashed line 930*d*. It 900*d* may be evanescently coupled with a light source via a feed optical waveguide (neither shown) and a detector via a pickup optical waveguide (neither shown). FIG. 9E illustrates a regular heptagon microresonator channel 900*e* having a central void and filleted corners 910*e*. The outline of a corresponding regular heptagon with sharp corners is depicted by 920*e*, and a bounded circle is depicted by dot-dashed line 930*e*. It 900*e* may be evanescently coupled with both a light source via a feed optical waveguide (neither shown) and a detector via a pickup optical waveguide (neither shown). Finally, FIG. 9E illustrates a regular octagon microresonator channel 900*f* having a central void and filleted corners 910*f*. The outline of a corresponding regular octagon with sharp corners is depicted by 920*f*, and a bounded circle is depicted by dot-dashed line 930*f*. It 900*f* may be evanescently coupled with both a light source via a feed optical waveguide (neither shown) and a detector via a pickup optical waveguide (neither shown).

§ 4.2 Simulation Results

The present inventors used Finite Element Analysis (FEA) to study, demonstrate, and propose an approach to reduce the energy loss at sharp-corners (e.g., 90 degree angle in a square microresonator) and enhance the resonance conditions for such optical microresonators. (See, e.g., COMSOL, RF. "RF Module User's Guide," Waveguide Adapter Model (2013): 43 (incorporated herein by reference).) This method utilizes the Electromagnetic Frequency Domain ("EMFD") analysis which uses the finite element method to solve the frequency domain form of Maxwell's equations. This method is typically used to model electromagnetic wave propagation in different media and structures designed to circulate electromagnetic energy at a particular frequency within a small space. In the following, the frequency domain analysis was performed for wavelength range of 1308 nm to 1312 nm with step size of 0.01 nm.

Figure 1:
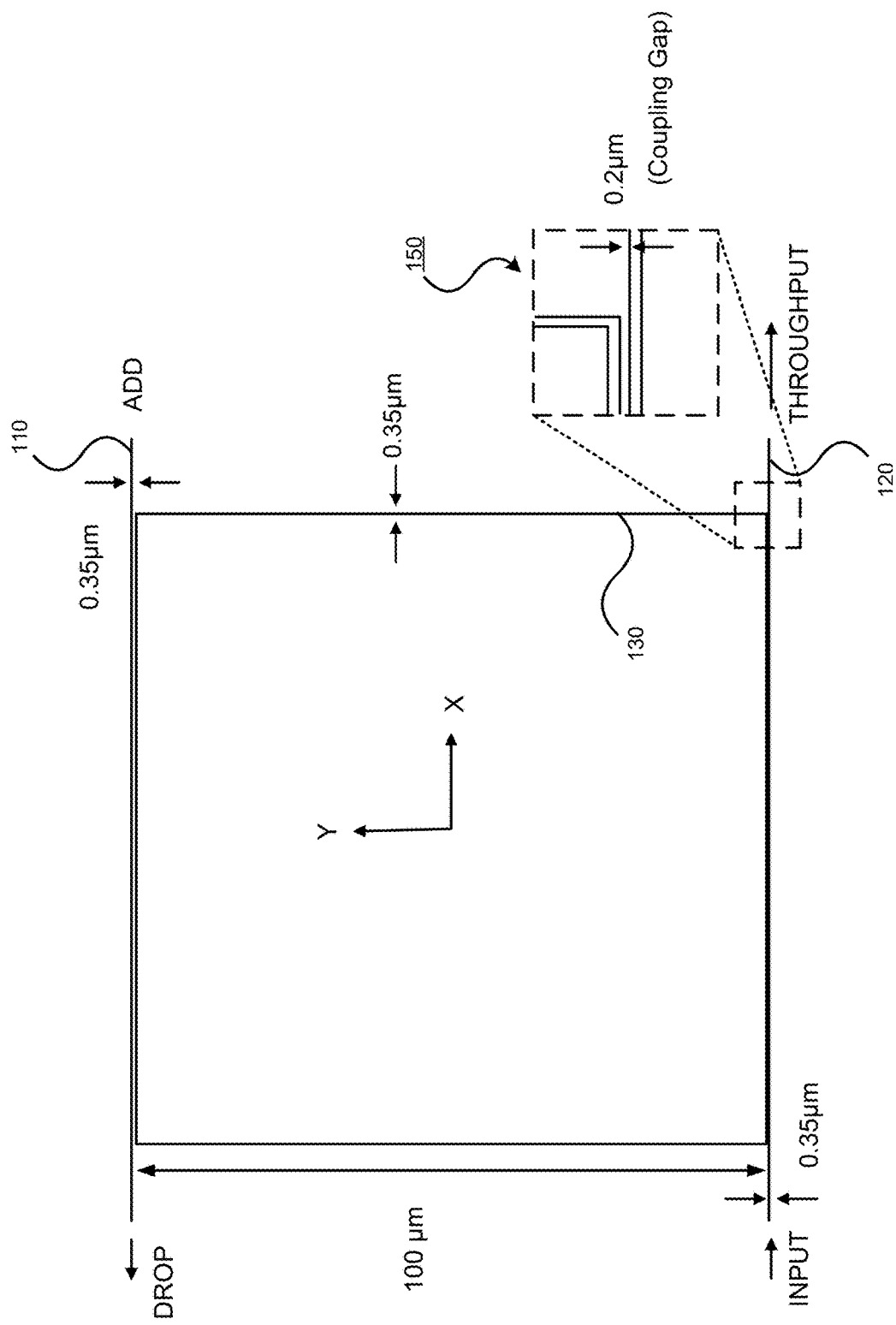
FIG. 1 is a schematic drawing of a planar waveguide-coupled closed loop square channel microresonator (channel material refractive index: 3.5, surrounding refractive index: 1.33).

§ 4.2.1 Comparison of a Square Shape Channel Microresonator Having Sharp Corners to a Square Channel Microresonator Having Filleted Corners FIG. 1 shows a schematic layout of the planar waveguide-coupled square microresonator channel add-drop filter 100 considered for the study described in this paper. Two parallel single mode waveguides 110 and 120 (referred to as "feed waveguide" and "pickup waveguide") of width 0.35 µm are laterally coupled with a single mode square microresonator channel 130 of sidewall length 100 µm and width 0.35 µm. As was the case with the microresonator 900*b* of FIG. 9*b*, the square microresonator 130 of FIG. 1 has a central void, though it does not have filleted (i.e., rounded) corners. As illustrated in the inset image 150, the resonator sidewalls and the waveguide sidewalls are separated with a gap distance 0.2 µm on both sides. To simulate the refractive index contrast between silicon and water (medium), both single mode waveguides 110/120 and square microresonator 130 have a refractive index n=3.5, while the background refractive index is 1.33. Boundary conditions at fiber core inlet has 1V/m electric field in z direction ($E_{0z}$=1), and everywhere else scattering boundary conditions are used.

Figure 2:
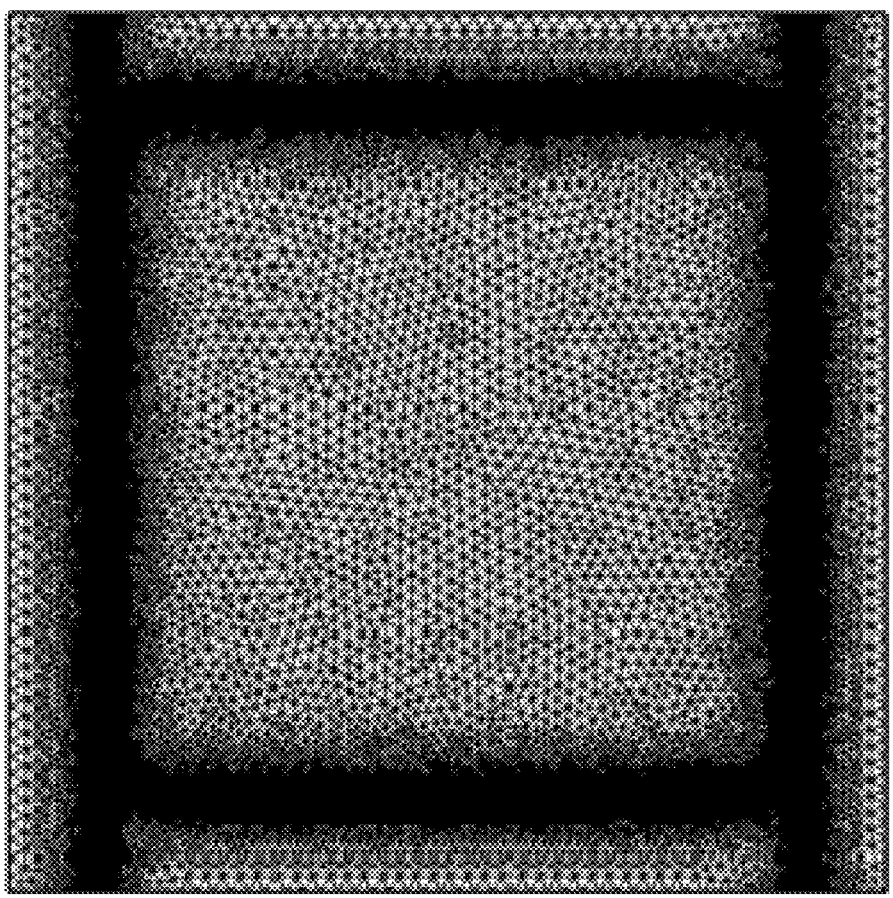
FIG. 2 illustrates a hybrid fine meshing of a model microresonator to be used in simulations.

To perform the EMFD analysis, a hybrid (combination of structured and unstructured) fine meshing technique, which generated 682140 domain elements and 27354 boundary elements in entire 125 µm×125 µm computational domain, was applied. The maximum element size in each domain is equal to wavelength/(5*sqrt(n)), where n is the refractive index of that particular domain. (See, e.g.: Nirmal Paudel, "Meshing in Electromagnetism," Comsol Support Case #1501371, Comsol Technical Support—North America, (2014) (incorporated herein by reference).) FIG. 2 illustrates a hybrid fine meshing 200 of the filter 100 model.

Figure 3:
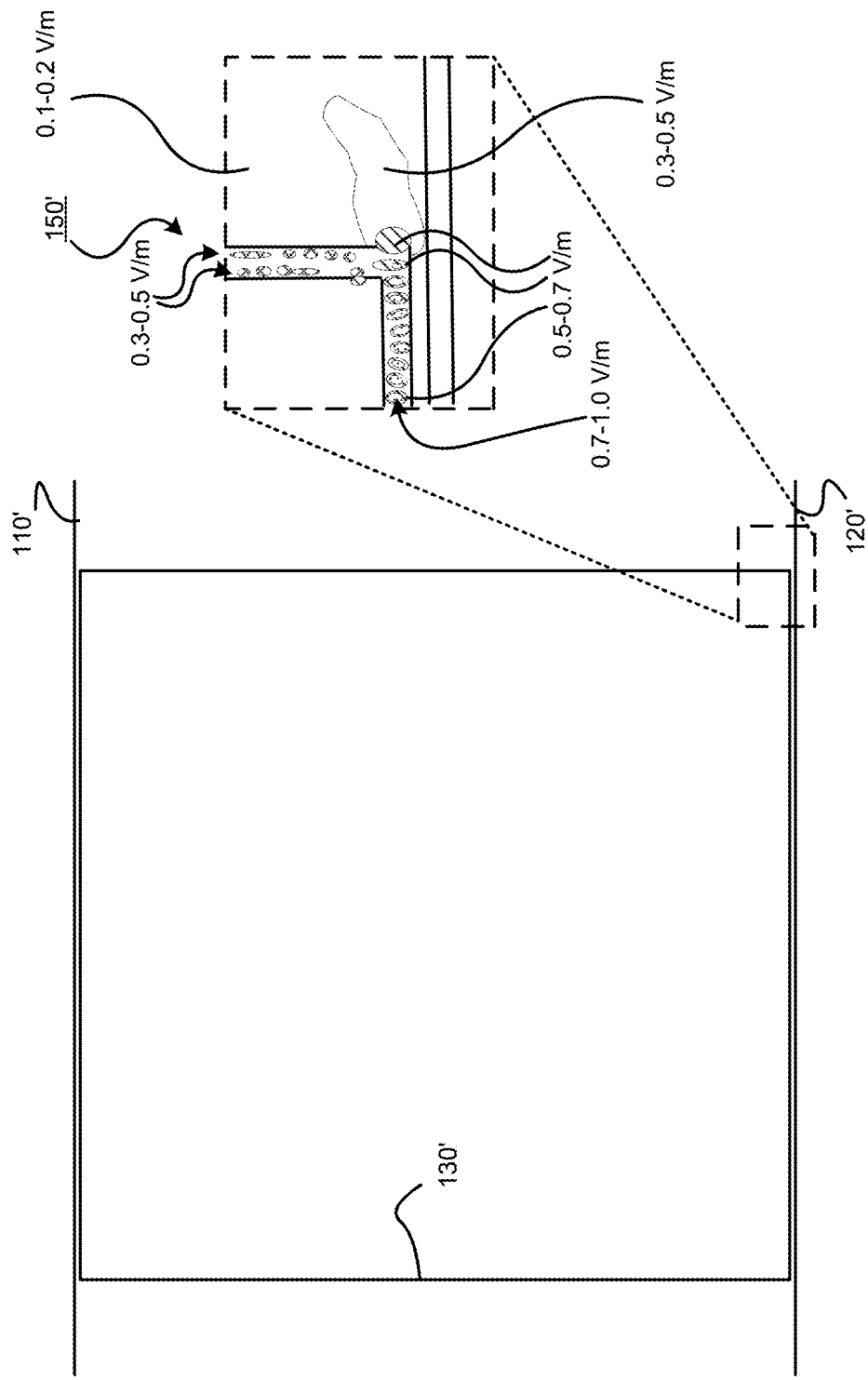
FIG. 3 illustrates electric field loss at the sharp-corners of closed loop square-shaped channel microresonator.

FIG. 3 is an electric field norm diagram 300 illustrating the loss of electric field at the sharp-corners of square-shaped microresonator 130' evanescently coupled with two parallel single mode waveguides 110' and 120'. More specifically, from FIG. 3, it is clear that the sharp turns at each of the corners of the square microresonator 130' do not allow the electromagnetic wave to travel from one side to the other side of microresonator 130' easily due to significant leakage of electromagnetic energy. This is more clearly illustrated in the inset image 150'. This creates challenges for both (1) circulation of energy in the microresonator and (2) creation of optimum resonance conditions.

Figure 4:
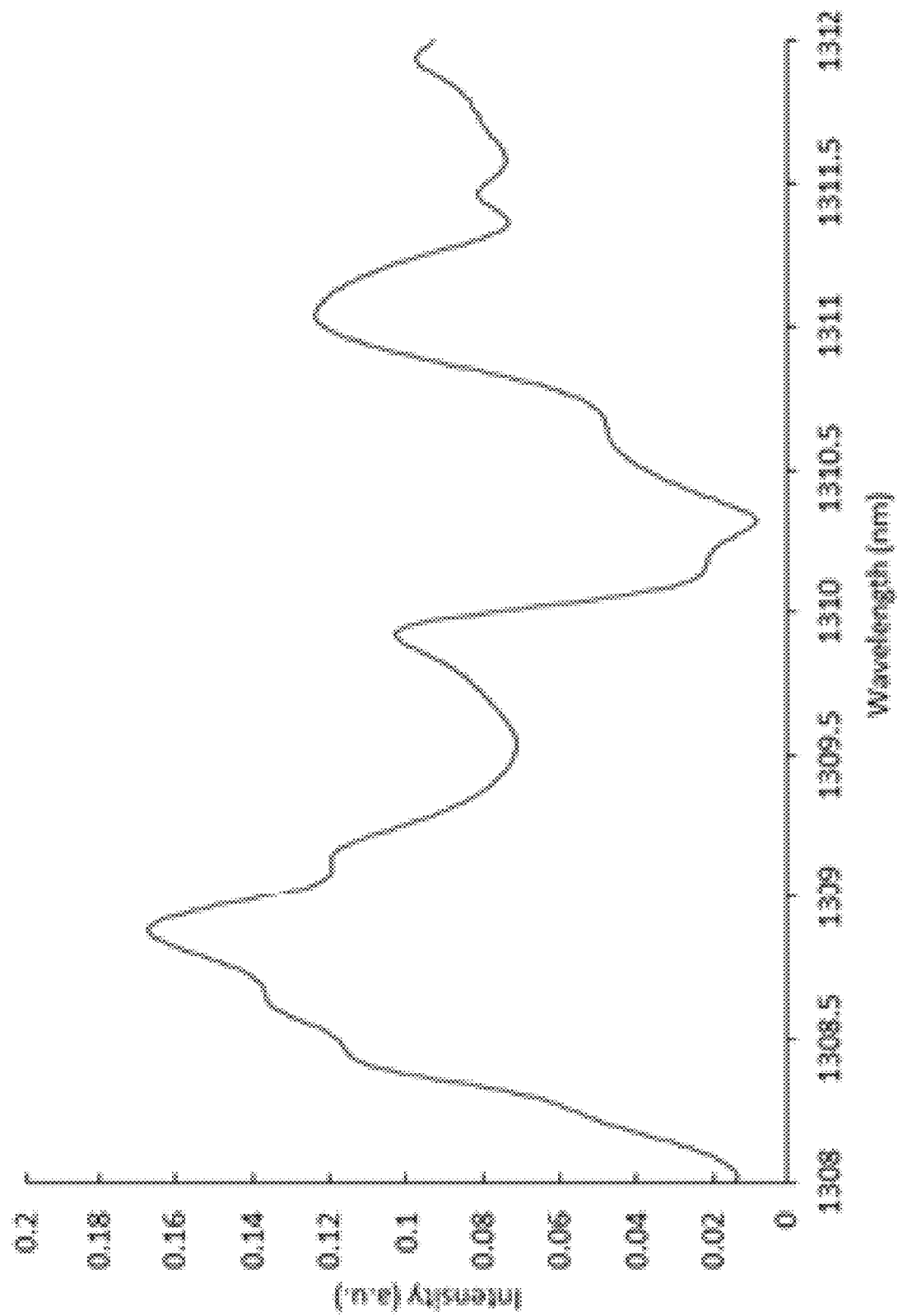
FIG. 4 illustrates intensity at drop port of sharp-cornered square-shaped channel microresonator depicted in FIG. 1.

FIG. 4 is a graph of the effect of wavelength (from between 1308 nm to 1312 nm) on intensity at a drop port of a sharp-cornered square-shaped microresonator, such as the filter 100 illustrated in FIG. 1. The graph of FIG. 4 was generated using EMFD analysis. The output at the drop port does not show any resonance conditions (which would be evidenced by spikes in intensity at one or more wavelengths). This is likely due to loss of electromagnetic energy at the sharp turn at each of the corners of the square microresonator. This limits the use of sharp-cornered microresonators, such as that 130 of FIG. 1, in modern advanced applications such as micro and nano-level particle detection using microresonators.

An example square microresonator having a central void and filleted (i.e., rounded) corners (as opposed to sharp corners) consistent with the present invention (Recall 900b of FIG. 9B) was simulated and compared with the example 100' of FIG. 1. This example square microresonator having filleted corners is similar to the filter 100 of FIG. 1, but has 10 µm fillets created at each of the corners of square-shaped microresonator. The present inventors provided such fillets to determine whether they would help slowly guide the electromagnetic wave from one side (or face) to the adjacent side (of face) of the square. EMFD analysis was performed without changing any other geometric parameters, boundary conditions, meshing specifications, and material properties of the example filter 100 of FIGS. 1 and 2; only the 10 µm fillets were added.

Figure 5:
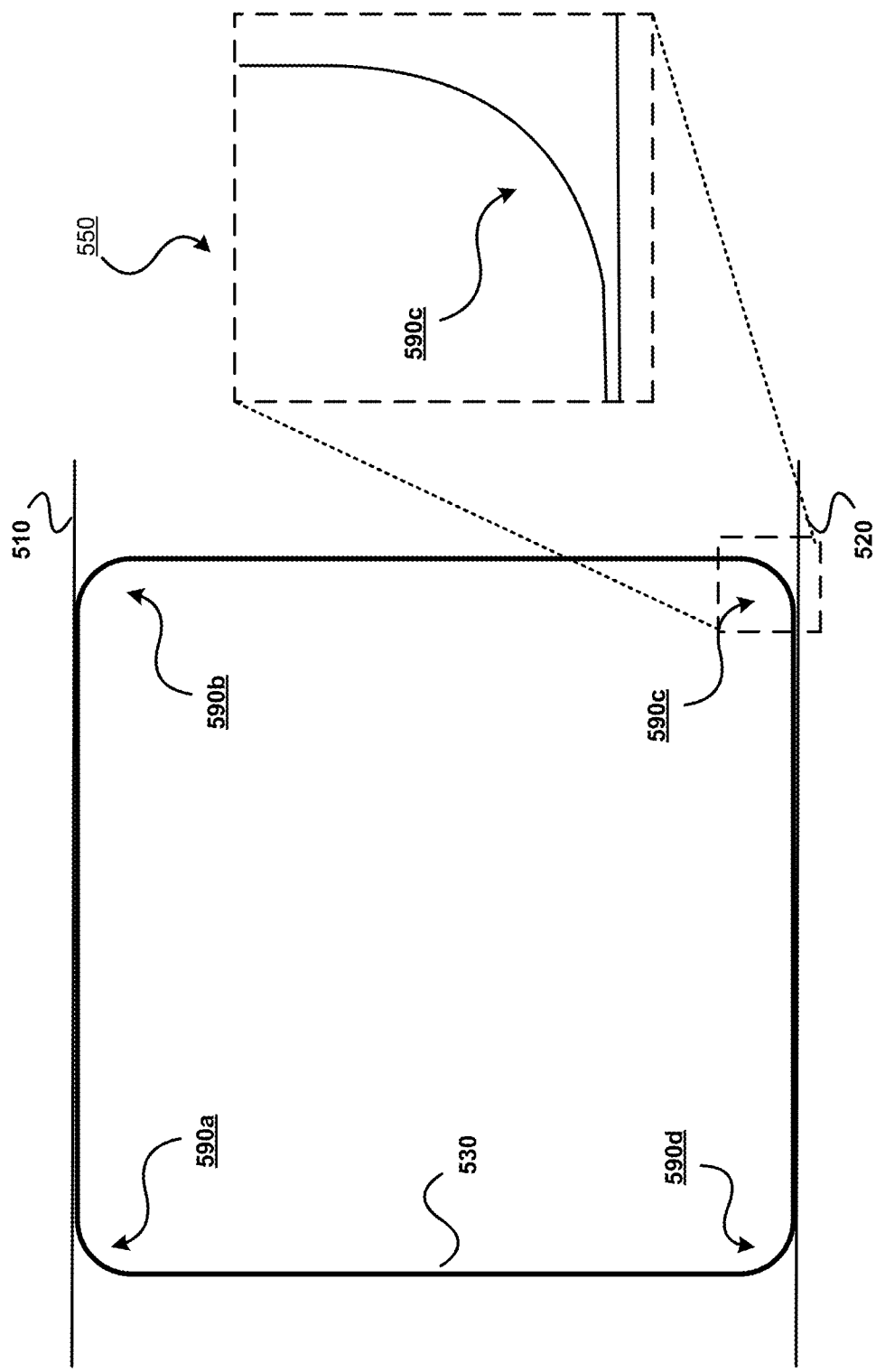
FIG. 5 illustrates the propagation of an electromagnetic wave through 10 μm fillet of square-shaped channel microresonator.

FIG. 5 is an electric field norm diagram 500 illustrating the electric field in the example square microresonator 530 having a central void and filleted corners 590a-590d, and evanescently coupled with two parallel single mode waveguides 510 and 520. FIG. 5 shows that the electromagnetic wave propagates smoothly from one side (or face) to an adjacent side (or face) of the same square-shaped hollowed and filleted microresonator without loss (or with much less loss) of electromagnetic energy. (Compare the inset image 550 of FIG. 5 with that 350 of FIG. 3.)

Figure 6:
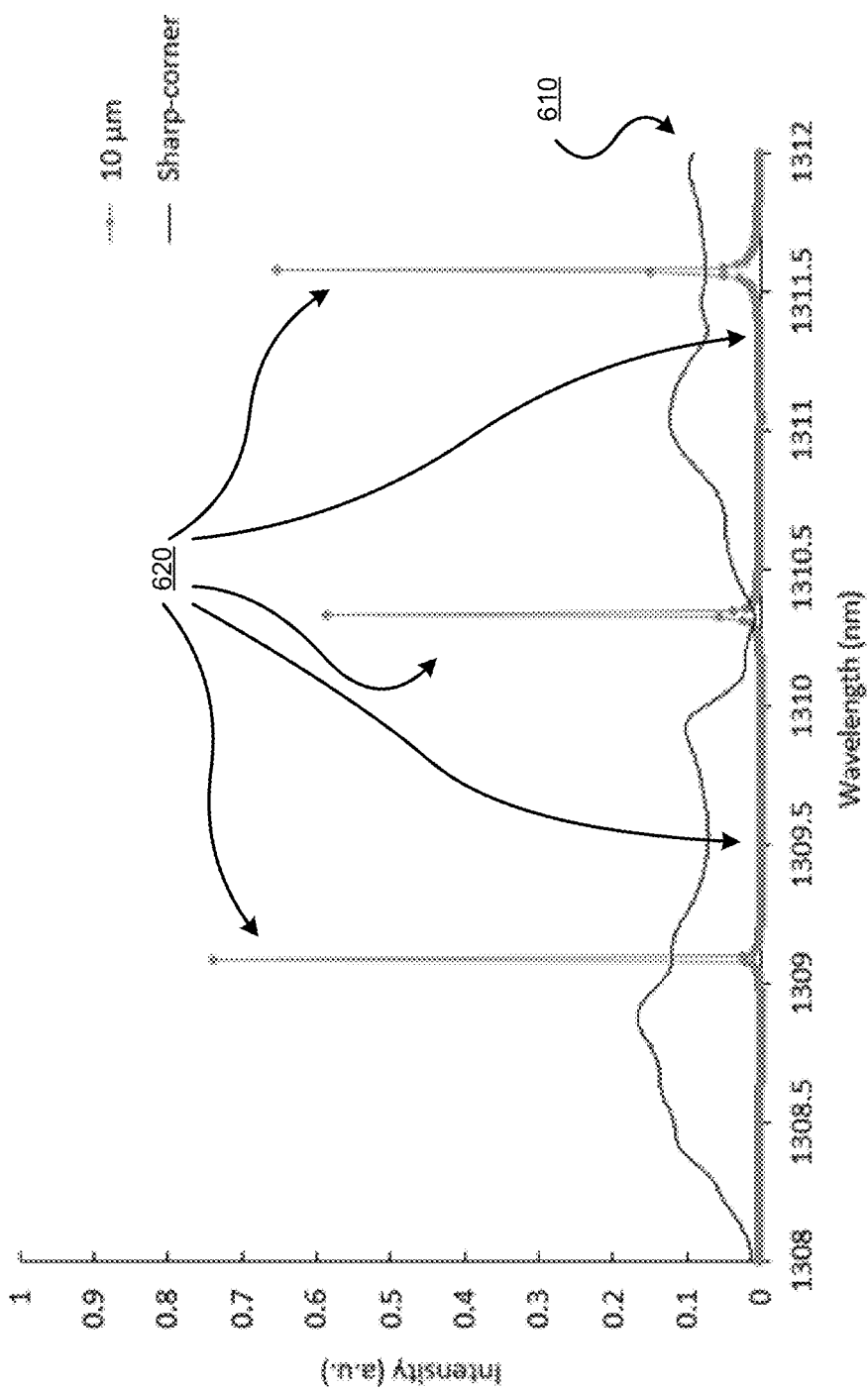
FIG. 6 illustrates intensity at drop port of square-shaped sharp-cornered channel microresonator (depicted in FIG. 1) compared to square shaped channel microresonator with 10 μm fillet (depicted in FIG. 5).

FIG. 6 is a graph of the effect of wavelength (from between 1308 nm to 1312 nm) on intensity at drop port of a square-shaped microresonator with a central void and filleted corners, such as the filter 500 illustrated in FIG. 5. In contrast with the graph of FIG. 4 (which is rescaled and drawn as plot 610 in FIG. 6), the output at the drop port of the square-shaped microresonator with a central void and filleted corners illustrated by plot 620 in FIG. 6 shows resonance conditions (as evidenced by the three spikes in intensity). In contrast with the graph of FIG. 4 (which is rescaled and drawn as plot 610 in FIG. 6), in the plot 620 of FIG. 6, the quality factor of the hollowed and filleted microresonator 530 (~105) is much higher than the one 130 having sharp corners. This comparison demonstrates that one can significantly improve the accuracy of polygonal microresonators and enhance their use for practical purposes by providing filleted corners.

§ 4.2.2 Simulations to Find the Optimal Fillet Radius

To quantify the effect of various fillet radii and determine a fillet radius that provides the best possible quality factor for aforementioned geometry, the present inventors repeated the simulation for of the 100 µm square resonator having a central void and fillets of radius varying from 0 (sharp-cornered) to 50 µm (a circle) in the steps of 5 µm. All other geometric parameters, boundary conditions, meshing specifications, and material properties remained the same as those in the two simulations of FIGS. 1-6. This quantification also allowed the comparison of quality factor and resonance conditions between single mode square-shaped filleted microresonator and conventional single mode circular microring resonator. (See FIG. 9B.) The results of these simulations are provided in Table 1, below.

TABLE 1

COMPARISON OF RESONANCE CONDITIONS OF SINGLE MODE SQUARE-SHAPED MICRORESONATOR WITH DIFFERENT FILLET RADII FOR FIXED DISTANCE BETWEEN FEED AND PICKUP WAVE GUIDES

| Fillet Radius (µm) | Quality Factor | Free Spectral Range (nm) |
|---|---|---|
| 0 (sharp-corner) | N/A | N/A |
| 5 | 20,114 | 1.214 |
| 10 | 130,758 | 1.244 |
| 15 | 15,754 | 1.273 |
| 20 | 4,511 | 1.298 |
| 25 | 4,085 | 1.332 |
| 30 | 2,971 | 1.365 |
| 35 | 3,113 | 1.404 |
| 40 | 5,462 | 1.439 |
| 45 | 14,538 | 1.478 |
| 50 (circular ring) | 50,786 | 1.506 |

As depicted in Table 1, the quality factor of a sharp-cornered square-shaped microresonator having a central void provided the lowest factor and providing filleted corners improved the quality factor in all cases. These results imply that the fillet design prevents the loss of electromagnetic energy, thereby providing an improved quality factor. As further depicted in Table 1, free spectral range ("FSR") increased with increasing values of fillet radii, and is highest for circular microring resonator. This is expected, since FSR is inversely proportional to the length of optical path which decreased with increasing values of fillet radii. (Recall, e.g., Saleh, Bahaa E A, Malvin Carl Teich, and Bahaa E. Saleh, *Fundamentals of photonics*, Vol. 22 (New York: Wiley, 1991) (incorporated herein by reference); and Cheng, David Keun, *Field and Wave Electromagnetics*, Vol. 2. (New York: Addison-Wesley, 1989) (incorporated herein by reference).)

Still referring to Table 1, note that the quality factor of square-shaped microresonator with 10 µm fillet (130,758) was the highest, and indeed was more than twice that of a conventional circular microring resonator (50,786).

Figure 7:
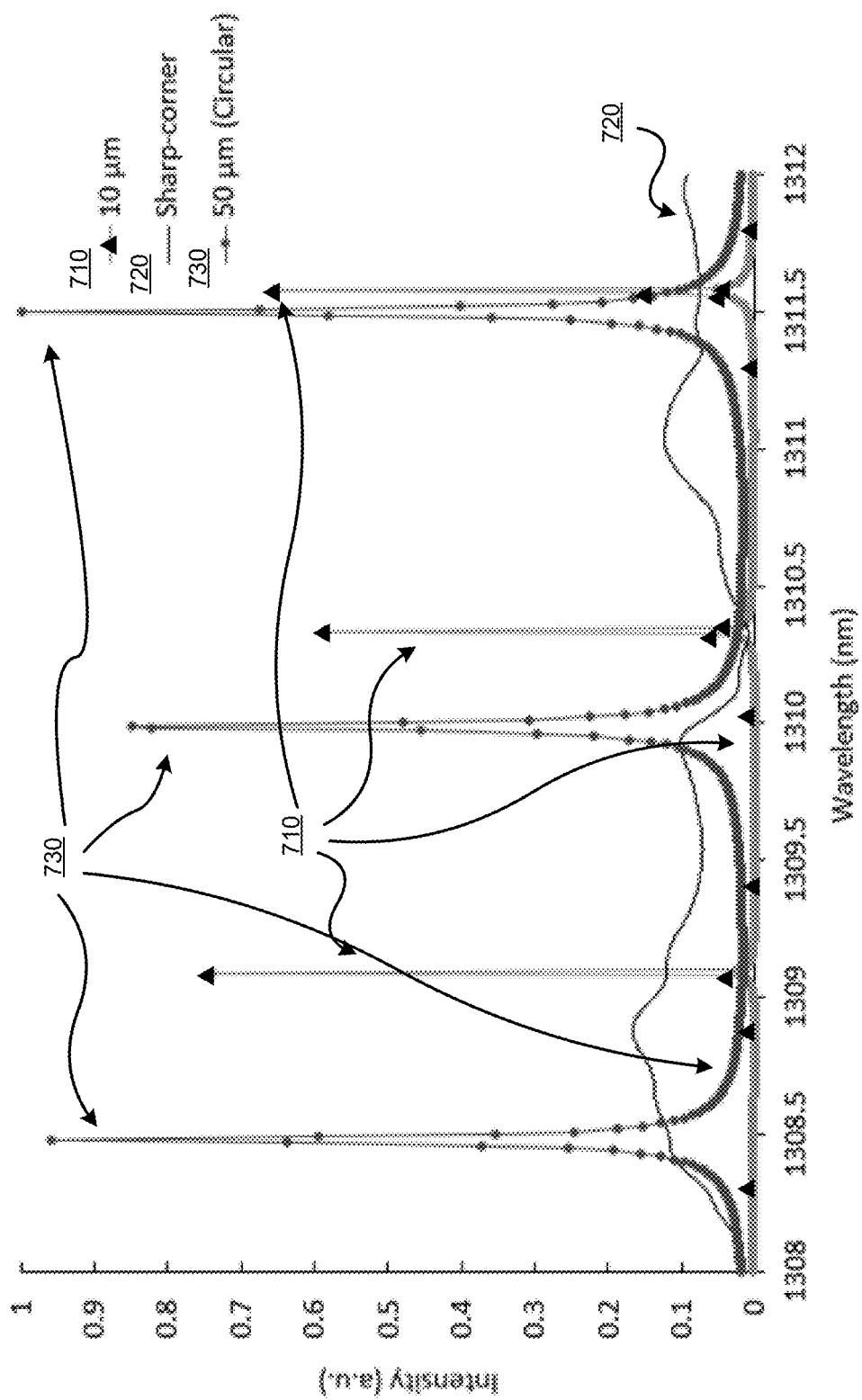
FIG. 7 illustrates a comparison of resonance conditions between single-mode circular microring resonator, and single-mode square-shaped channel microresonator with sharp-corner and 10 μm fillet.

FIG. 7 is a graph of the effect of wavelength (from between 1308 nm to 1312 nm) on intensity at a drop port of a square-shaped single mode microresonator with sharp corners 720, filleted corners 710, and of a ring-shaped microresonator 730. A comparison of the plots of resonance conditions between the circular microring resonator 730, and the single mode square-shaped microresonator with sharp-corners 720 and 10 µm filleted corners 730 shows that the single mode square-shaped microresonator with 10 µm filleted corners 730 has the highest intensity peaks. The present inventors believe that this is mainly due to the minimal loss of electromagnetic energy in case of single mode square-shaped microresonator with 10 µm fillet design. More specifically, the present inventors believe that in this design, the wave mostly travels through linear sides of the microresonator without any loss due to linear propagation, and the loss of energy only occurs at curved fillets where the wave gradually turns directions. In contrast, in case of conventional circular microrings, a fraction of energy is lost at each point on the perimeter where the wave reflects internally off the curved sides of the resonator as it continually changes directions in following the circular path.

Referring back to Table 1, the FSR value of the single mode square-shaped microresonator with 10 µm fillet (1.244) is lower than that of circular microring (1.506). This can be advantageous when optical measurements and/or detection needs to be performed with low wavelength range laser devices for narrow range precision spectroscopy applications because one can obtain more resonances in the required narrow wavelength range.

For the examples analyzed in Table 1, the optical path length changed as the distance between two waveguides was kept constant and the fillet radius was varied. Table 2, provided below, lists the quality factors and the FSR values when optical path length was kept constant at 400 μm. The fillet radius and the distance between two waveguides was varied using the relation for filleted square, $$P=4S-(8-2\pi)R, \quad (1)$$

where P is the optical path length (perimeter) of the microresonator and R is the fillet radius of the microresonator. The shape of the microresonator is geometrically circumscribed within a square of sides of length S. (See, e.g., "Perimeter and Area of a Rounded Rectangle." Available at: http://www.had2know.com/academics/rounded-rectangle-area-perimeter.html (incorporated herein by reference).)

TABLE 2

COMPARISON OF RESONANCE CONDITIONS OF
SINGLE MODE SQUARE-SHAPED MICRORESONATOR
WITH DIFFERENT FILLET RADII
BUT SAME OPTICAL PATH LENGTH (400 μm)

| Fillet Radius (μm) | Quality Factor | Free Spectral Range (nm) |
|---|---|---|
| 0 (sharp-corner) | N/A | N/A |
| 5 | 9,336 | 1.182 |
| 10 | 32,613 | 1.187 |
| 15 | 119,951 | 1.187 |
| 20 | 16,328 | 1.187 |
| 25 | 7,691 | 1.184 |
| 30 | 6,881 | 1.189 |
| 35 | 4,086 | 1.188 |
| 40 | 1,125 | 1.163 |
| 45 | 3,629 | 1.188 |
| 50 | 5,686 | 1.193 |
| 55 | 10,899 | 1.193 |
| 60 | 26,911 | 1.193 |
| 63.66 (circular ring) | 43,542 | 1.182 |

As expected, the FSR value in all cases was approximately 1.18 nm except where the quality factor is very low. A square-shaped microresonator with 15 μm fillet provided a higher quality factor (119,951) than that (43,542) of circular microring with 400 μm perimeter. This analysis reconfirms the ability of square-shaped filleted microresonator to perform better than a microring for both measurement and detection applications.

Figure 10:
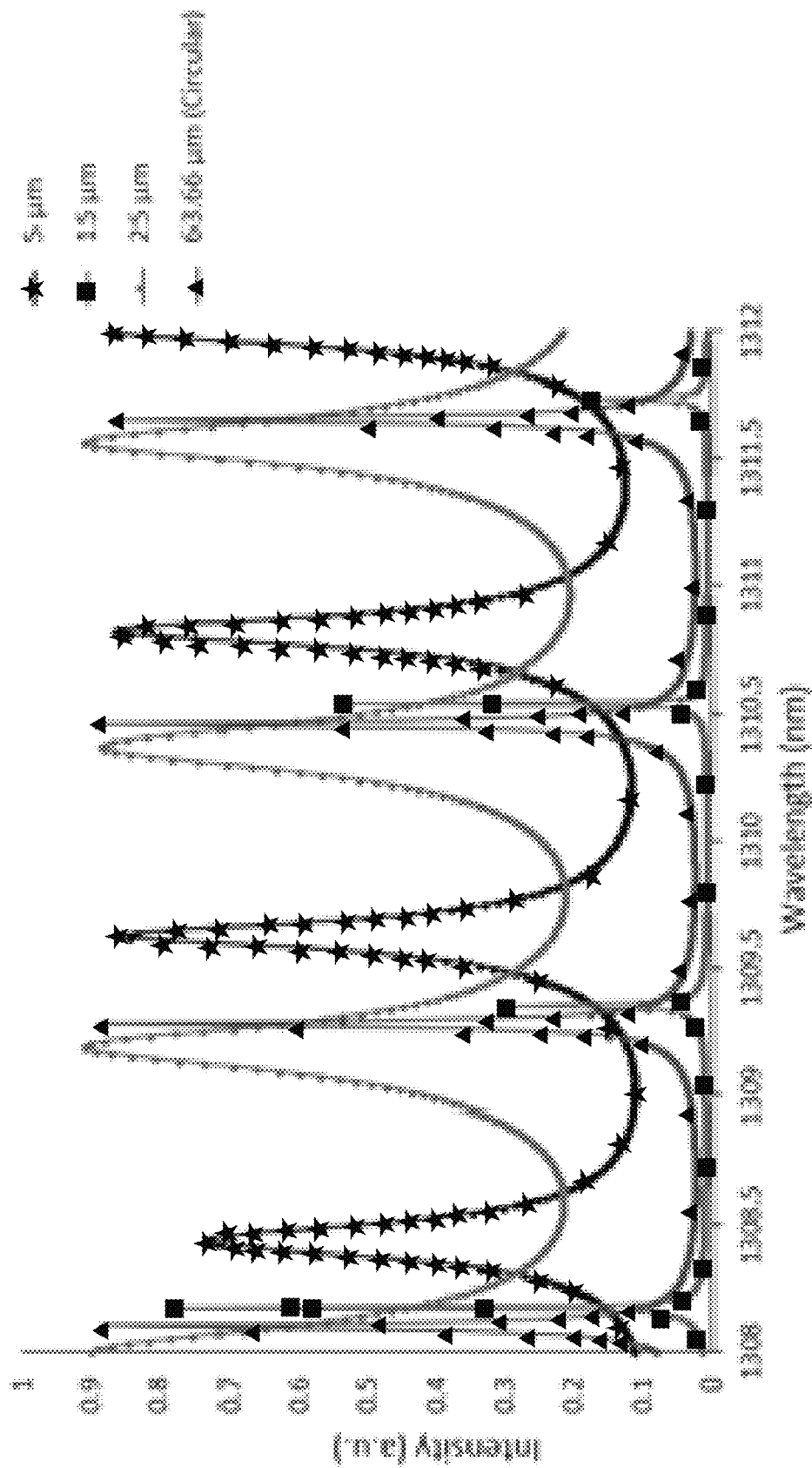
FIG. 10 is a graph which illustrates resonance conditions between single-mode circular microring resonator, and filleted and hollowed square-shaped single-mode channel microresonators of different fillet radii with same optical path length (400 μm).

FIG. 10 is a graph illustrating the resonance output at drop port for selected cases listed in Table 2. Note that, although the optical path length is same, the resonant wavelength is different for each case as the shape of the resonator changed.

Figure 11:
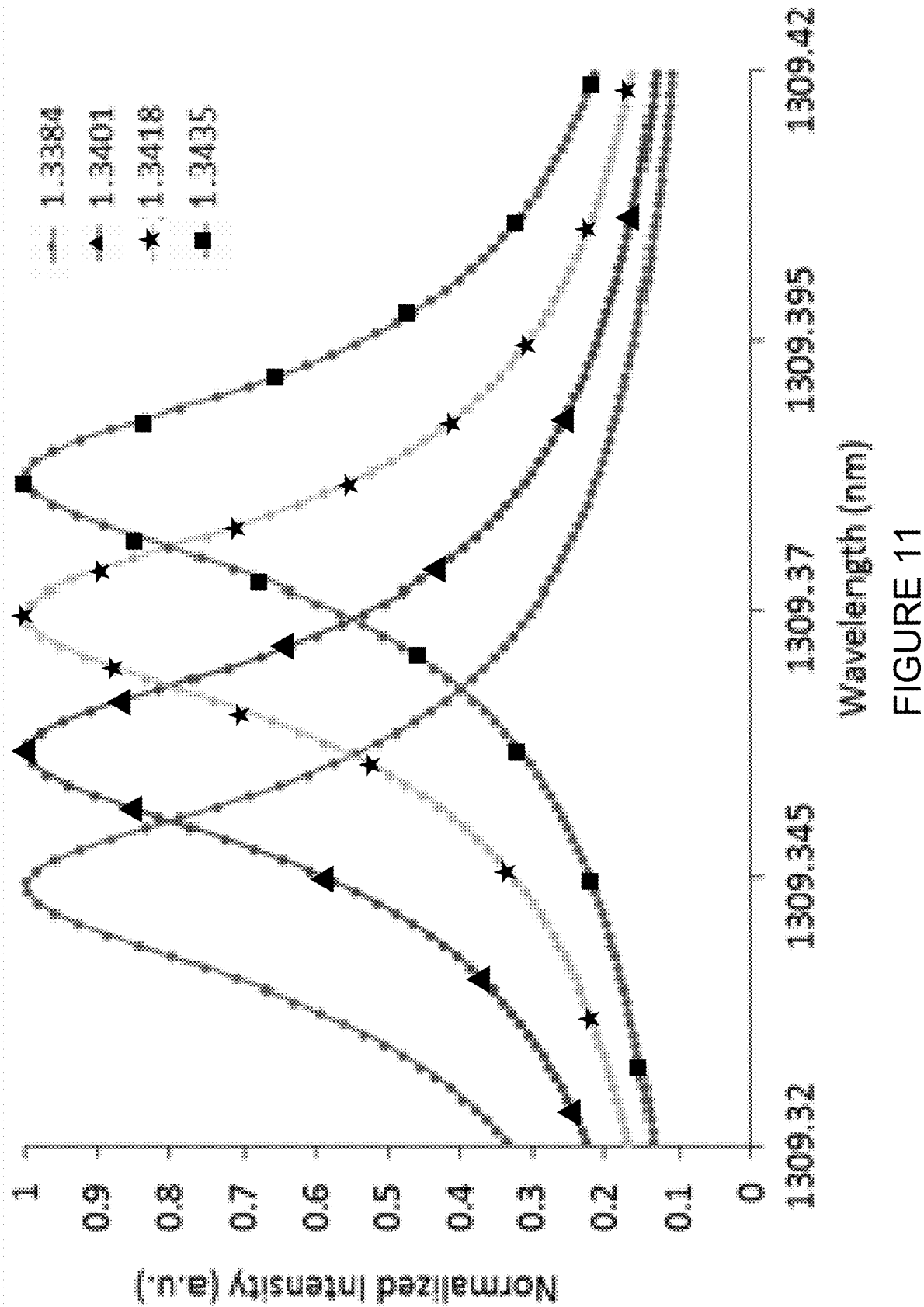
FIG. 11 is a graph which illustrates resonance shifts using a single-mode circular microring resonator with changing refractive index of surrounding medium (resolution: 1 μm, optical path length: 400 μm, channel width: 0.35 μm).
Figure 12:
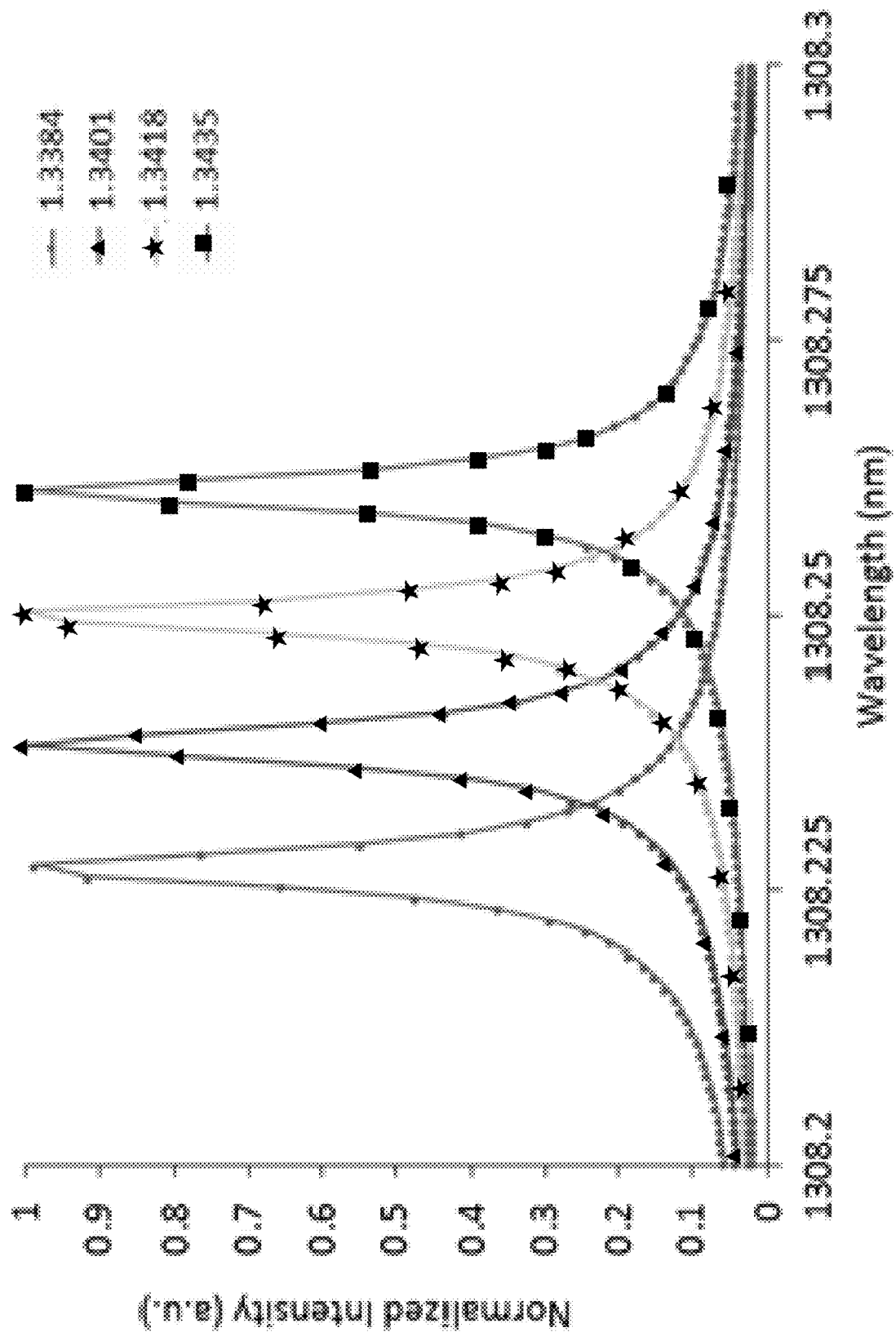
FIG. 12 is a graph which illustrates resonance shifts using a filleted and hollowed square single-mode microchannel microresonator with changing refractive index of surrounding medium (resolution: 1 pm, optical path length: 400 μm, channel width: 0.35 μm, fillet radius of curvature: 15 μm).

The efficacy of this microresonator was evaluated by simulating its ability to detect the minute change in refractive index of surrounding medium. Such ability enables the measurement of temperature, pressure, velocity, rotation, acceleration, vibration, linear and angular position, strain, humidity, viscosity, chemical changes, electro-magnetic fields, particle absorption, and myriad of biomedical applications. FIGS. 11 and 12 show the resonance shifts for 0.0017 change in refractive index using single mode circular microring resonator and filleted single mode squared microresonator, respectively. The circular microring resonator (outer diameter=63.66 μm) and filleted single mode squared microresonator (fillet radius=15 μm) have same optical path length (400 μm) and width (0.35 μm). Comparing FIGS. 11 and 12 shows that the resonance shifts for both systems are approximately same (~12 μm). However, the peaks are relatively sharper in case of filleted single mode squared microresonator, which is in indication of better quality factor and can be extremely helpful for easier detection of changes in the system.

§ 4.3 Example Fabrication Methods

Figure 8:
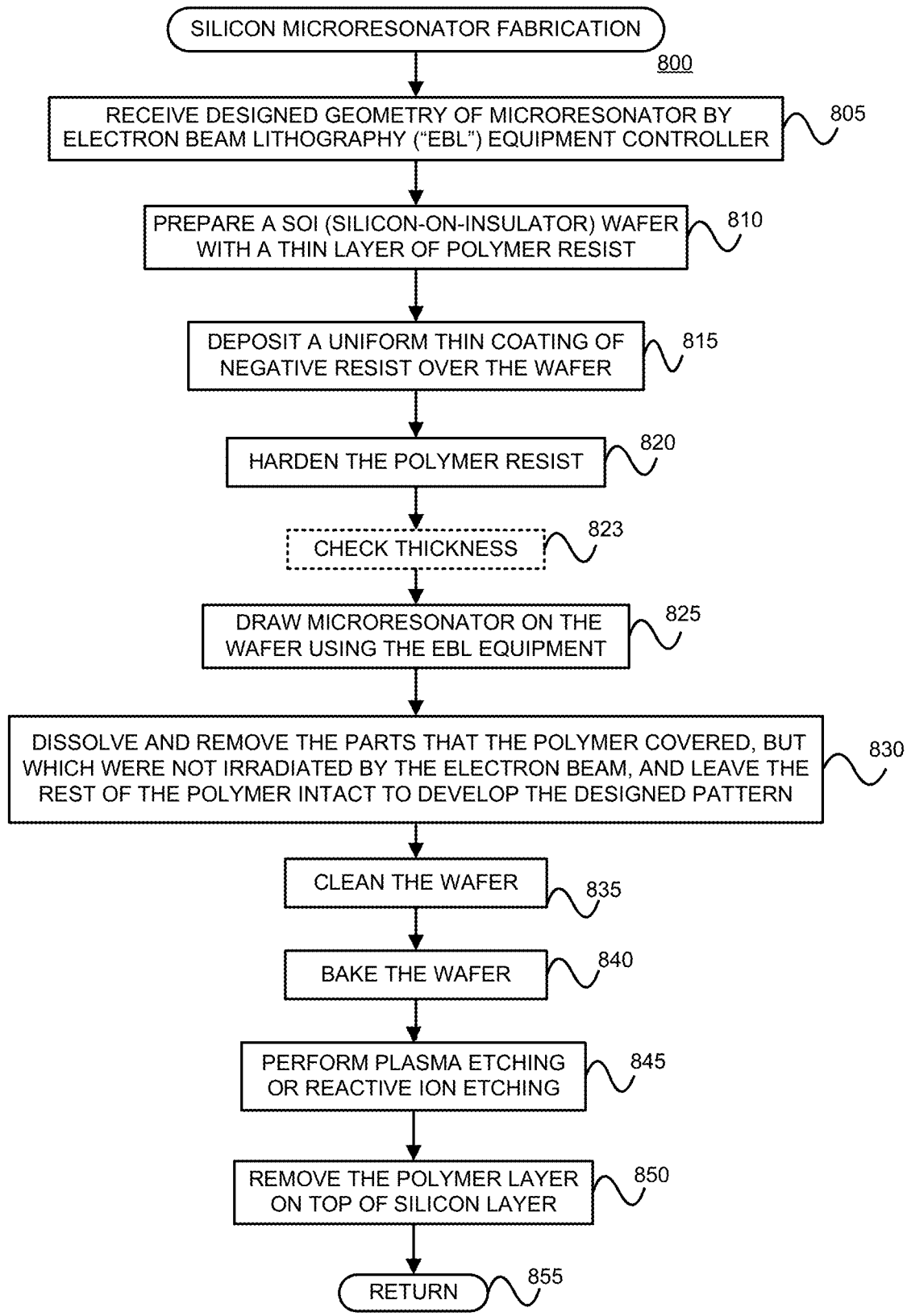
FIG. 8 is a flow diagram of an example method for fabricating example microresonators in a manner consistent with the present invention.

FIG. 8 is a flow diagram of an example method 800 for fabricating a silicon microresonator in a manner consistent with the present invention. A designed geometry of microresonator is received by electron beam lithography ("EBL") equipment controller. (Block 805) A silicon-on-insulator ("SoI") wafer is prepared with a thin layer of polymer resist. (Block 810) Next, a uniform thin coating of negative resist is deposited over the wafer. (Block 815) The polymer resist is then hardened. (Block 820) The thickness of the resist coating may then be checked. (Block 823) Then, the designed microresonator is drawn on the wafer using the EBL equipment. (Block 825) Next, the parts that the polymer which were not irradiated by the electron beam are dissolved and removed, thereby leaving the rest of the polymer intact to develop the designed pattern. (Block 830) The wafer is then cleaned. (Block 835) Next, the cleaned wafer is baked. (Block 840) Then, the silicon layer is shaped into the microresonator pattern by performing plasma etching or reactive ion etching. (Block 845) Finally, the polymer layer on top of silicon layer is removed (Block 850) and the example method 800 is left (Node 855).

Referring back to block 805, in some example embodiments consistent with the present invention, the geometry of microresonator is designed using a computer CAD interface connected to the EBL equipment.

Referring back to block 810, in some example embodiments consistent with the present invention, the SoI wafer is covered with a thin layer of ma-N2403, which is a polymer that acts as negative ebeam photoresist when exposed to an electron beam. For example, the substrate should be free of impurities and moisture. Therefore, the SOI (e.g., device Layer (SI): 220 nm, Oxide: 3 μm) wafer may be cleaned by dipping it in Acetone for 5 minutes and then in IPA (99.6% Pure) for 5 minutes. The wafer may then be rinsed with DI water and dried with Nitrogen spray guns. The wafer may then be baked at 110° C. for 90 seconds to remove the moisture. Finally, to promote resist adhesion, 100 μL/cm² of SurPass 4000 may be applied by spin coating at 3000 rpm for 30 seconds.

Referring back to block 815, in some example embodiments consistent with the present invention, the coating of ma-N2403 polymer is a uniform thin coating of 300 nm nanometers and is deposited over the wafer using a spinner. More specifically, a uniform 300 nm coating of ma-N2403 (a polymer that act as negative resist when exposed to electron beam) may be created by spin coating 250 μL/cm² of ma-N2403 in two steps of 100 rpm for 10 seconds and 3000 rpm for 30 seconds.

Referring back to block 820, in some example embodiments consistent with the present invention, the polymer is hardened by baking it at 110° C. for 60 seconds.

Referring back to block 823, in some example embodiments consistent with the present invention, the thickness (e.g., 300 nm) of the resist coating may be checked with a thin film (e.g., nanometer range) step height measurement tool.

Referring back to block 825, in some example embodiments consistent with the present invention, when the wafer is prepared, it is placed inside the EBL equipment where the microresonator is drawn on the wafer using dose of 1000 $\mu C/cm^2$ acceleration voltage of 100 kV, and a beam current of 300 pA. The electron beam precisely follows the design of microresonator and only irradiates previously defined parts of the wafer where the electrons should be deposited.

Referring back to block 830, in some example embodiments consistent with the present invention, when the wafer is taken out of the EBL equipment, it is dipped into Microposit MF 319 Developer for 10 minutes to develop the polymer pattern on the silicon layer. The solvent dissolves and removes only the parts of the polymer covered, which were not irradiated by the electron beam. The rest of the polymer remains intact on top of silicon layer of the wafer.

Referring back to block 835, in some example embodiments consistent with the present invention, the water may be cleaned by dipping the developed resist water in IPA for 5 minutes, and then thoroughly rinsed with DI water, and finally dried with a nitrogen spray gun.

Referring back to block 840, in some example embodiments consistent with the present invention, in order to increase the etch resistance and the thermal stability of the resist, the wafer may then be backed at 110° C. for 7 minutes.

Referring back to block 845, in some example embodiments consistent with the present invention, after the wafer is cleaned, plasma etching or reactive ion etching is applied, where $SF_6$ and $C_4F_8$ gases are pulsed at the rate of 50 sccm in 1:2 ratio at processing pressure of 10 mtorr, table temperature of 15° C., etching rate of 220 nm/min using power of 800 W.

Finally, referring back to block 850, in some example embodiments consistent with the present invention, the polymer layer on top of Silicon layer is removed by oxygen etching, where free oxygen radicals are pulsed at the rate of 30 sccm at processing pressure of 100 mTorr, table temperature of 20° C., etching rate of 60 nm/min using power of 100 W.

§ 4.4 Alternatives, Extensions and Refinements

Although a square microresonator with a central void and filleted corners was described, other geometries having a central void and filleted corners are possible. For example, other regular polygons (with N sides, where N is at least three) such as an equilateral triangle microresonator with filleted corners (900a of FIG. 9A), a regular pentagon microresonator with filleted corners (900c of FIG. 9C), a regular hexagon microresonator with filleted corners (900d of FIG. 9D), etc., are possible. The present inventors expect there will be a tradeoff between energy loss due to the sharpness of each turn (which would favor regular polygon microresonators with more sides) versus energy loss due to number of internal reflections (which would favor regular polygon microresonators with less sides). Further, although regular polygons are described, example microresonators consistent with the present invention may include polygons that do not have equal sides, but that have filleted corners.

Although a square microresonator having 100 µm sides was described, other side lengths may be used.

Although a fillet with a radius of 10 µm was found to be optimal for a square microresonator geometrically circumscribed within a square having 100 µm sides for a given wavelength light, different radii of curvature of fillets can be found to be optimal (e.g., via simulation or experimentally) for microresonators having different geometries, different sizes, and/or made of different materials, and for different wavelengths of light.

Different wavelengths of light may be used.

Materials having different refractive indices and/or backgrounds having different refractive indices may be used.

Fabrication methods different from the example method of § 4.3 may be used.

§ 4.4.1 Using the Effect of Rotation on Optical Resonances in Single Mode Square-Shaped Microresonator with Different Fillet Radii to Optimize Waveguide to Resonator Coupling Single-mode square shaped microresonators with filleted corners significantly eliminate optical loss at sharp-corners to increase the quality factor of polygonal resonator system and enable their use for advanced measurement/detection applications. However, the large interaction length between the waveguide and the resonator may make the coupling strength very sensitive to any phase mismatch between the waveguide mode and resonator mode, leading to a degradation of Q-factor. The electromagnetic frequency domain finite element analysis presented here quantifies the effect of rotation of the polygonal resonator with respect to the feed waveguide and/or the pickup waveguide on quality factor of single-mode resonances in an example of enhancement of a resonator add-drop configuration system. The results enable one to improve the quality factors of these microresonators.

In § 4.2 above, a rounded fillet design was incorporated in the sharp-cornered square resonator that slowly turn the electromagnetic wave from one straight segment of the resonator to the adjacent straight segment, thereby reducing the optical loss at sharp corners. When the fillet radius of curvature was varied maintaining constant optical path length, this single-mode resonator with 15 µm radius of curvature showed quality factor one order of magnitude higher than conventional circular microring resonators for optical path length of 400 µm. (Recall e.g., Table 2 above.) This finding was mainly attributed to the negligible optical loss along the straight segments which account for approximately three-fourth of the total optical path length. However, for several other values of fillet radii of curvature, the quality factor was found to be lower and several possible reasons for this observation were provided. It should be noted that the straight coupling segment of the resonator was parallel to the linear waveguide. (See, e.g. FIG. 5 above.) (See, e.g., the article, P. Panindre and S. Kumar, "Effect of Rounding Corners on Optical Resonances in Singlemode Sharp-cornered Microresonators," *Optics Letters*, Vol. 41, No. 4 (2016), (incorporated herein by reference).) In this § 4.4.1, the effect of rotating the resonator with respect to straight waveguides on the overall quality factor of add-drop single-mode resonator system is quantified.

The geometric and input parameters of the resonator system in the present analysis are same as those used in § 4.2 above for the purpose of comparative analysis. The electromagnetic frequency domain (EMFD) analysis is performed for wavelength range of 1308 nm to 1312 nm, with step sizes of 0.001 nm near resonance and 0.01 nm elsewhere.

FIG. 13 shows a schematic layout of the planar waveguide-coupled single-mode channel square shaped microresonator with filleted corners add-drop filter 1300 considered for the 2D analysis described in this section. The radius of curvature at the filleted corners of this microresonator 1330 is 40 µm which had provided lowest quality factor (~$10^3$) in previous analysis. (Recall Table 2 above.) From the descriptions above, it is implied that the interaction length must be compatible with the wavelength, otherwise the electromagnetic energy can be coupled from resonator back to the feed waveguide along the interaction length instead of circulating inside the resonator leading to lower quality factor. To remove this restriction, the microresonator 1330 is rotated through 45 degrees in a counter-clockwise direction with respect to (w.r.t.) feed waveguide 1310. It is expected that the straight segments along optical path will reduce the optical loss and provide a quality factor better than conventional microring resonator.

Two parallel single-mode waveguides of 1310 and 1320 width 0.35 µm are laterally coupled with a single-mode channel square shaped microresonator with filleted corners of channel width 0.35 µm and total optical path length of 400 µm. The resonator sidewalls and the waveguide sidewalls are separated with a gap distance 0.2 µm on both sides. To simulate the refractive index contrast between silicon and water (medium), both single-mode waveguides 1310 and 1320 and microresonator 1330 have a refractive index n=3.5 while the background refractive index is 1.33. Boundary condition at the inlet has 1 V/m electric field in z direction ($E_z$=1, TE Mode), and everywhere else the scattering boundary conditions are used.

Figure 14:
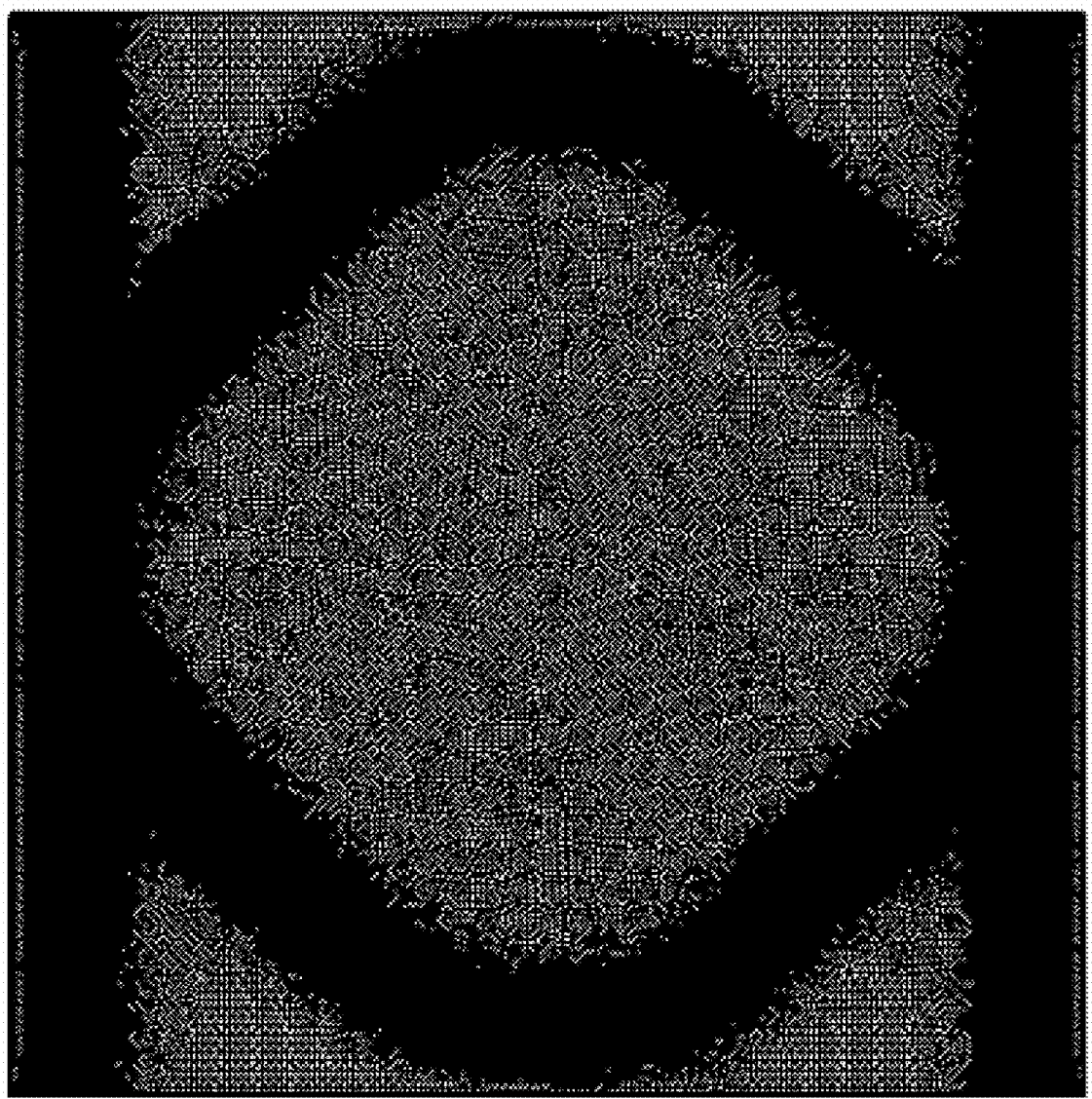
FIG. 14 illustrates hybrid fine meshing of the 2D numerical model used to simulate the microresonator depicted in FIG. 13.

To perform the EMFD analysis, a hybrid (combination of structured and unstructured) 2D fine meshing technique is applied which generated 733,968 domain elements and 30,648 boundary elements in entire 150 µm×150 µm computational domain (shown in FIG. 14). The maximum element size in each domain is equal to wavelength/(5*√n), where n is the refractive index of that particular domain. (See, e.g., the article, N. Paudel, "Meshing in Electromagnetism," *Comsol Support Case:* 1501371, Comsol Technical Support, North America (2014) (incorporated herein by reference).)

Using EMFD analysis, the intensity at throughput port for aforementioned geometry between 1308 nm to 1312 nm wavelength range is shown in FIG. 15, and compared with resonance conditions obtained using same resonator with same optical path length and whose coupling side is parallel to the feed waveguide from § 4.2 above. The quality factor of rotated microresonator with fillet radius of 40 µm is two orders of magnitude higher than that of the microresonator whose coupling sides are parallel to the feed waveguide, specifically, Q-factor value of 111,430 for the rotated microresonator versus 1,125. (Recall values from Table 2.) Similar results are observed for other fillet radii keeping optical path length in the microresonator constant at 400 µm. For example, for fillet radius of 30 µm the Q-factor of rotated microresonator is 105,842 versus 6,881, and for fillet radius 50 µm, 102,455 for the rotated microresonator versus 5,686.

To quantify the effect of rotation on optical resonances in single-mode square-shaped microresonator with filleted corners 1330, the microresonator 1330 with 40 µm fillet radius of curvature is rotated through 0.5 degrees to 45 degrees in small increments with respect to the feed waveguide 1310 and the quality factor of all these cases are provided in Table 3. The quality factor consistently improved as the angle of rotation with respect to feed waveguide increased to 45 degrees. It is noted that the increase in quality factor is comparatively lower when the fillet radius of curvature is 60 µm, when the square-shape with filleted corners essentially appears like a circular ring. As expected, the free spectral range (FSR) in all cases is approximately 1.19 nm, except for the case without rotation where the Q-factor is very low.

It is noted that different quality factors can be achieved with exact same geometry of resonator 1330 just by rotating it with respect to the feed waveguide 1310. This effect is not possible in conventional circular microresonators.

TABLE 3

EFFECT OF ROTATION ON QUALITY FACTORS OF RESONANCE CONDITIONS OF SINGLE-MODE SQUARE-SHAPED MICRO RESONATOR WITH 40 µm RADIUS OF FILLET AND OPTICAL PATH LENGTH OF 400 µm

| Angle of Rotation w.r.t. feed waveguide (degrees) | Quality Factor | Free Spectral Range (nm) |
|---|---|---|
| 0 | 1,125 | 1.163 |
| 0.5 | 13,054 | 1.194 |
| 1 | 32,635 | 1.194 |
| 5 | 52,688 | 1.194 |
| 10 | 54,264 | 1.194 |
| 20 | 100,440 | 1.194 |
| 30 | 107,594 | 1.194 |
| 45 | 119,430 | 1.194 |

§ 4.5 Conclusions

The present inventors quantified the effect of incorporating a fillet design in single mode sharp-cornered microresonators. A square microresonator with a central void and filleted corners offers better quality factor, easier evanescent coupling, and lower FSR, as compared to conventional circular microrings, is described. The present inventors also believe that the fabrication of square-shaped hollowed and filleted microresonator should be easier and more efficient than that of circular microresonators because most of perimeter is linear and higher precision will be required only at the fillet. In contrast, in case of fabricating circular microresonators, higher manufacturing precision will be required at all points on the curved sides. Therefore, various fillet-cornered, linear, microresonators can be advantageously used in modern advanced applications.

The analysis in § 4.4.1 quantifies the effect of rotation on single-mode optical resonances in the above microresonators. This effort also establishes an approach to achieve different quality factors with same microresonator just by changing its orientation with respect to feed waveguide. Rotating the square-shaped microresonator with filleted corners and other similar microresonators can remove the restrictions imposed by the requirement of minimal phase mismatch between the resonator mode and the waveguide mode in these resonator systems. These findings have established an approach to develop single-mode polygonal resonators with quality factor better than conventional circular single-mode resonator systems.

What is claimed is:

1. Apparatus comprising:
   a) at least one optical waveguide coupled with a light source and with a detector; and
   b) a microresonator evanescently coupled with each of the at least one optical waveguide, wherein the microresonator includes an optical path defined by a polygon provided with filleted corners and a central void, thereby defining is closed loop optical channel,
   wherein at least one of the at least one optical waveguide is evanescently coupled with the microresonator at a curved segment at a filleted corner of the microresonator.

2. The apparatus of claim 1 wherein the microresonator is a square with a central void and filleted corners.

3. The apparatus of claim 2 wherein sides of the square microresonator are on the order of 100 µm and wherein each of the filleted corners has a radius of curvature of between 5 and 15 µm.

4. The apparatus of claim 3 wherein sides of the square microresonator are on the order of 100 μm and wherein each of the filleted corners has a radius of curvature of about 10 μm.

5. The apparatus of claim 1 wherein a geometry of the microresonator, a size of the microresonator, and a radius of curvature of each of the filleted corners of the microresonator are selected such that a quality factor of the microresonator is at least twice that of a circular microresonator having a size bound by the size of the microresonator.

6. The apparatus of claim 1 wherein the at least one optical waveguide is a single optical waveguide that is evanescently coupled with the microresonator at a curved segment at a filleted corner of the microresonator.

7. The apparatus of claim 1 wherein the at least one optical waveguide includes a feed optical waveguide coupled with the light source and a pickup optical waveguide coupled with the detector, and wherein the feed optical waveguide is evanescently coupled with the microresonator at a curved segment at a first filleted corner of the microresonator and the pickup optical waveguide is evanescently coupled with the microresonator at a curved segment at a second filleted corner of the microresonator.

8. The apparatus of claim 1 wherein the at least one optical waveguide includes a feed optical waveguide coupled with the light source and a pickup optical waveguide coupled with the detector.

9. The apparatus of claim 1 wherein the at least one optical waveguide is a single optical waveguide.

10. An article of manufacture comprising a microresonator to be evanescently coupled with at least one optical waveguide, the microresonator being formed as a polygon provided with filleted corners and defining a central void, wherein a geometry of the microresonator, a size of the microresonator, and a radius of curvature of each of the filleted corners of the microresonator are selected such that a quality factor of the microresonator is at least twice that of a circular microresonator having a size bound by the size of the microresonator, wherein at least one of the at least one optical waveguide is evanescently coupled with the microresonator at a curved segment at a filleted corner of the microresonator.

11. The article of manufacture of claim 10 wherein the microresonator is a square with a central void and filleted corners.

12. The article of manufacture of claim 11 wherein sides of the square microresonator are on the order of 100 μm and wherein each of the filleted corners has a radius of curvature of between 5 and 15 μm.

13. The article of manufacture of claim 11 wherein sides of the square microresonator are on the order of 100 μm and wherein each of the filleted corners has a radius of curvature of about 10 μm.

14. The article of manufacture of claim 10 wherein the at least one optical waveguide includes both a feed optical waveguide and a pickup optical waveguide, and wherein the feed optical waveguide is evanescently coupled with the microresonator at a curved segment at a first filleted corner of the microresonator and the pickup optical waveguide is evanescently coupled with the microresonator at a curved segment at a second filleted corner of the microresonator.

15. The article of manufacture of claim 10 wherein the at least one optical waveguide includes both a feed optical waveguide and a pickup optical waveguide.

16. The article of manufacture of claim 10 wherein the at least one optical waveguide is a single optical waveguide.

* * * * *